UNITED STATES PATENT OFFICE 2,561,418

DRILLING MUDS AND METHODS OF USE

Martin A. Ryan, Bartlesville, Okla., assignor to Phillips Petroleum Company, a corporation of Delaware No Drawing. Application August 18, 1947,
Serial No. 769,309

32 Claims. (Cl. 252—8.5)

This invention relates to improved water base drilling muds. In one specific aspect it relates to drilling muds having a reduced water loss. In another specific aspect it relates to drilling muds having a reduced viscosity. In another specific aspect it relates to drilling muds containing water soluble salts of substituted starch acids or substituted inulin acids. In a less preferred aspect it relates to drilling muds containing simple water soluble substituted starch ethers or inulin ethers.

By water soluble salts of substituted starch acids I mean to include the water soluble alkali metal salts (especially sodium, potassium and lithium), the water soluble alkaline earth metal salts (especially magnesium, calcium, barium and strontium), and other water soluble metal salts, as well as the water soluble ammonium salt and the water soluble salts of strong organic bases (such as triethanolamine, ethylenediamine, morpholine, and piperidine) of carboxyalkyl starch ethers (especially carboxymethyl starch ether, alpha carboxyethyl starch ether, beta carboxyethyl starch ether, and the various carboxypropyl starch ethers), of starch acid sulfate, of starch alkyl sulfonates (especially starch methylsulfonate, starch alpha ethylsulfonate, starch beta ethylsulfonate, and the various starch propylsulfonates) and of other such substituted starch acids. By water soluble salts of substituted inulin acids I means the same group of compounds enumerated in the last sentence with inulin in place of starch.

Starch is assumed to be composed of a number "$n$" of units of d glucose residues each residue having the quantitative formulae $C_6H_{10}O_5$. The following structure has been deduced for starch:

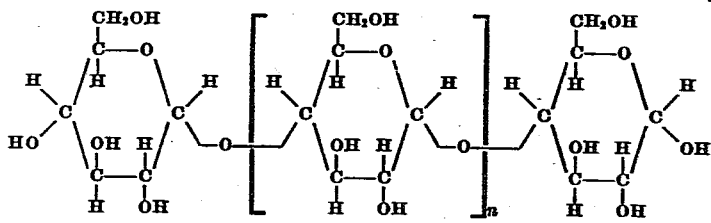

Each d glucose unit has three hydroxyl groups (except the end units which have four).

The water soluble substituted starch ethers of the present invention are formed by replacing the hydrogen (—H) of enough of these hydroxyl groups with water solubilizing radicals to make the substituted starch ether water soluble. The same is true with the corresponding inulin ethers.

For example sodium carboxymethyl starch ether, which is also sometimes called sodium starch glycolate, may be a reaction product of starch, sodium hydroxide, and sodium monochloroacetic acid, the hydrogen (—H) of a hydroxyl group of said d glucose unit being replaced by (—CH$_2$COONa). And potassium beta carboxyethyl starch ether may be the reaction product of potassium hydroxide and acrylonitrile, the hydrogen (—H) of a hydroxyl group of said d glucose unit being replaced by (—CH$_2$CH$_2$COOK)

The examples in the above paragraph are both (A) ether, and (B) salts of substituted starch acids. Lithium starch sulfate, however, is only (B) as it is not an ether. The lithium salt of starch acid sulfate may be made by reacting starch and sulfuric acid in the presence of pyridine, and then reacting the reaction product with lithium hydroxide. The hydrogen (—H) of a hydroxyl group of said d glucose unit is replaced by (—SO$_2$OLi) and a very effective drilling mud additive is produced. An example of an ether (A) which is not (B) a salt of a substituted starch acid, is an alkyl starch ether such as methylstarch in which the hydrogen (—H) of a hydroxyl group of said d glucose unit is replaced by a methyl group (—CH$_3$). Methylstarch, ethylstarch and propylstarch may be employed. Hydroxyalkyl starch ethers may be employed, such as hydroxyethyl starch ether, hydroxypropyl starch ether and hydroxybutyl starch ether.

The most preferred specific embodiments of my invention comprise the use of any of the above enumerated water soluble substituted starch compounds in (A) a water base well drilling mud comprising sufficient suspended solid materials to form a filter cake; and in (B) an oil in water emulsion well drilling mud in which the emulsion is stabilized by the selected water soluble substituted starch compound.

Among the highly preferred water soluble substituted starch compounds selected from the group composed of water soluble salts of substituted starch acids and water soluble starch ethers for use as well drilling mud additives are:

Alkali metal and ammonium carboxymethyl starch ethers.

Alkali metal, alkaline earth metal and ammonium beta carboxyethyl starch ethers.

Alkali metal, alkaline earth metal and ammonium starch beta ethylsulfonate. (This material may be the reaction product of beta chloroethane sulfonic acid, sodium hydroxide and starch. The acid may be made from ethylene and chlorosulfonic acid

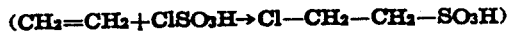
$$(CH_2=CH_2+ClSO_3H \rightarrow Cl-CH_2-CH_2-SO_3H)$$

and when the starch is treated a hydrogen (—H) from one of the hydroxyl groups is replaced by (—CH$_2$CH$_2$SO$_2$ONa).

Difficulties have been experienced in the prior art in trying to produce a low water loss drilling mud which will not have too high a viscosity and which will not ferment or need large amounts of costly treating chemicals.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. The weight of the mud prevents blowouts of formation pressures especially when weighting agents are employed. In order to perform these important functions properly the drilling mud must have suitable viscosity and other qualities at all times in spite of adverse conditions encountered in drilling the well. Thixotropic properties of the mud support the cuttings during any time the pumps are shut down.

In drilling wells there are two major difficulties caused by natural formations penetrated. The first of these difficulties is that if salt is encountered the salt will cut ordinary drilling mud so that its viscosity is entirely too high, the clay particles are flocculated, and there is grave danger of the drilling pipe twisting in half or gas cutting or a blowout occurring due to the salt cutting of the mud. The other difficulty encountered is that when a formation known as heaving shale is penetrated, this heaving shale absorbs water from the drilling mud and by a caving or disintegration action common to clay and shale, or by a swelling action common to bentonite materials, the well hole is closed around the drill string choking off the circulation of drilling mud and often seizing the drill string so that the drill string twists in half.

One object of my invention is to produce a drilling mud which can be used not only in ordinary formations but which will resist contamination by salt and which will not cause heaving shale or similar formations to cave or swell.

Another object is to provide an improved drilling mud.

Another object is to provide an improved method of drilling.

Another object is to provide a method of drilling suitable in ordinary formations, in salt containing formations and in formations tending to cave or heave.

Numerous other objects and advantages of the invention will be apparent to those skilled in the art upon reading the following specification and the accompanying claims.

OPERATION

In the present invention I prefer to employ as a colloidal suspending agent or dispersing agent in a drilling mud a water soluble substituted starch selected from the group consisting of water soluble salts of substituted starch acids and water soluble starch ethers wherein the important salts are those of the alkali metals especially lithium, sodium and potassium and the alkaline earth metals especially magnesium, calcium, strontium and barium. The amount of these water soluble substituted starches employed can be varied considerably as even small amounts give a corresponding smaller effect, from one to five pounds per barrel (42 gallons) being preferred, but as this depends on the formation being drilled much less or much more of them may be employed and still the advantages of my invention will be achieved to a greater or lesser extent, so that it is believed better to claim the true limits, the lower limit being that which reduces the water loss and the upper limit being that which by high gel strength, or viscosity, cannot be circulated in the well by the mud pump (which mud pump is a well known element of all rotary drills).

The manner in which these water soluble substituted starches are made is immaterial to the present invention provided a water soluble material is produced. In this respect all the reactions or just the reaction to finally produce the water soluble material may be carried out in the mud pit, or even the well bore of the well being drilled, as for example carboxymethyl starch ether which is an acid and is insoluble in water may be added to the drilling mud in the pit or elsewhere, and sufficient alkali, such as ammonium hydroxide, added to make the desired water soluble salt of carboxymethyl starch ether. Or starch, sodium hydroxide and monochloroacetic acid can be thrown in the drill pit to react therein. The same is true of the formation of the other water soluble substituted starches. It is preferable to make the complete water soluble substituted starch elsewhere and to add the finished product.

The water soluble substituted starches may be in dried powder form, the particle size not being critical. However, for rapid solution a particle size where 95% will pass an 80 mesh screen is useful. In the case of some slowly water soluble substituted starches, or to speed up the solution of any water soluble substituted starch, any suitable wetting agent may be added first, such as alcohol, or alkaline solutions, to form a concentrated solution or paste, and then diluting said concentrated solution or paste with water and/or the drilling mud and adding the diluted mixture to the drilling mud in the mud pit or at the pump intake.

In rotary drilling the usual methods consist in adding the water soluble substituted starch powder (which may be added to the drilling fluid flowing in the mud ditch to the pump intake; or to the mud pit) by scattering the powder over the surface of the drilling mud. An alternative method would be to make up a more or less concentrated solution of the water soluble substituted starch and add that in a stream to the drilling mud. The drilling fluid containing the water soluble substituted starch and clayey material and/or other suspended solids such as calcium carbonate or barium sulfate and water is pumped in circulation or reverse circulation in the drill string or used to fill or partially fill the well in the usual operations of well drilling and well controlling of the prior art. When these water soluble substituted starches are so used in sufficient amount a new result is achieved in that salt water does not cut the mud qualities enough to harm it for drilling and formations exposed to it do not cave or heave enough to stop the drilling. Suitable control of mud treating agents may be used, such as phosphates and/or quebracho if desired.

The mode or theory of operation by which these water soluble substituted starches protect the surface of clay or bentonite from attack by water is obscure, but it is believed that as the water attempts to enter the clay they form a layer of a protective material on the outside of the clay or bentonite preventing the clay or bentonite from absorbing the water from the drilling mud.

Drilling muds containing water soluble substituted starches selected from the group enumerated above are not subject to injury by salt to any detrimental degree but may still be useful as drilling muds when there is as much in some instances as 238,000 parts per million of sodium chloride in the drilling mud or more. Such muds containing them often have low initial gel strength which allows gas bubbles to come out of the drilling mud so rapidly that the drilling mud will not become gas cut. Elimination of gas cutting reduces the chances of blowouts. Such drilling muds are often characterized by very thin filter cake thickness and by very small water loss or complete absence of water loss. This is very useful in avoiding loss of water to the formation, as well as the resultant swelling or caving of the formation which occurs with some formations. They do not generally ferment or spoil. Numerous other advantages of such drilling muds will be apparent from a study of the following representative experiments which have been selected to show in a minimum of space the advantages of water soluble substituted starches selected from the above enumerated group.

TESTS

The tests of the properties of solutions of these water soluble substituted starches and/or drilling muds were all made with standard drilling mud laboratory equipment.

The measurements of pH were all made with a Beckman "Industrial Model M" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

EXAMPLE A

Four different laboratory base muds were used in evaluating the samples, a low calcium, fresh water EB–10F mud, a high calcium, fresh water EB–10F mud, a high calcium, salt water EB–10–S3 mud and a kaolin bentonite salt water KB–10–S3 mud. In each mud there was a 10 to 1 weight ratio of Ezmix clay or china clay (kaolin) to bentonite, a total clay content around 12%, and sufficient $BaSO_4$ to weight the muds to around 11–12 pounds per gal. The EB–10 mud was treated with 1% $BaCO_3$ (or phosphates) to give the low calcium mud, it was used unchanged to give the high calcium mud, and it was treated with sodium chloride (50% saturated) to give the salt water mud.

EXAMPLE B

In making the tests on the muds, quantities of sodium carboxymethyl starch ether equivalent to 1, 2, 4 and sometimes 8 pounds per barrel were dissolved in the laboratory prepared muds. Each treated mud sample was stirred for 30 minutes on a high speed electric mixer and then tested for viscosity, gel strength, water loss, cake thickness and pH. Standard test equipment and procedures as outlined in API Code 29 were used.

A sodium salt of carboxyethyl starch ether may be prepared that will compare very favorably with sodium carboxymethyl starch ether as a drilling mud additive and that will have better properties, particularly in regard to reduction in water loss, in high calcium muds.

Table I

SODIUM CARBOXYMETHYL STARCH ETHER (CMS) IN LOW CALCIUM EB–10F MUD

| CMS added lbs. per bbl | 0 | 1 | 2 | 4 | 8 |
|---|---|---|---|---|---|
| Viscosity, cps | 19 | 17 | 24 | 42 | 60 |
| Initial gel strength, g | 26 | 6 | 6 | 6 | 9 |
| 10 min. gel strength, g | 39 | 27 | 40 | 50 | 51 |
| Water loss, ml. in 30 min | 29 | 9 | 6 | 5 | 4.2 |
| Cake thickness, in | 3/64 | 3/64 | 3/64 | 3/64 | 3/64 |
| pH of filtrate | 9 | 8.9 | 8.7 | 8.9 | 8.7 |

Table II

SODIUM CARBOXYMETHYL STARCH ETHER (CMS) IN HIGH CALCIUM EB–10F FRESH WATER MUD

| CMS added, lbs. per bbl | 0 | 1 | 2 | 4 |
|---|---|---|---|---|
| Viscosity, cps | 12.5 | 21 | 30 | 23 |
| Initial gel strength, g | 22 | 10 | 1 | 0 |
| 10 min. gel strength, g | 30 | 55 | 50 | 30 |
| Water loss, ml. in 30 min | 51 | 47 | 19 | 7 |
| Cake thickness, in | 15/64 | 13/64 | 5/64 | 3/64 |
| pH of filtrate | 7.5 | 8.2 | 7.3 | 7.5 |

Calcium in filtrate, as $CaCO_3$, was 2200 P. P. M.

Table III

POTASSIUM CARBOXYMETHYL STARCH ETHER (K–CMS) IN HIGH CALCIUM SALT WATER EB–10–S3 MUD

| K–CMS added lbs. per bbl | 0 | 1 | 2 | 4 |
|---|---|---|---|---|
| Viscosity, cps | 11 | 17.5 | 31 | 42.5 |
| Initial gel strength, g | 15 | 27 | 30 | 1 |
| 10 min. gel strength, g | 30 | 26 | 50 | 50 |
| Water loss, ml. in 30 min | 55 | 79.5 | 68.5 | 31 |
| Cake thickness, in | 17/64 | 19/64 | 18/64 | 19/64 |
| pH of filtrate | 4.7 | 5.6 | 6.4 | 7.7 |

Calcium 2300 P. P. M., chlorides 95,000 P. P. M.

Table IV

SODIUM CARBOXYMETHYL STARCH ETHER (CMS) IN KB–10–S3 KAOLIN BENTONITE SALT WATER MUD

| CMS added, lbs. per bbl | 0 | 1 | 2 | 4 |
|---|---|---|---|---|
| Viscosity, cps | 100 | 86.5 | 105 | 112 |
| Initial gel strength, g | 100 | 55 | 35 | 10 |
| 10 min. gel strength, g | 100 | 120 | 90 | 120 |
| Water loss, ml. in 30 min | 89 | 66 | 32 | 11.5 |
| Cake thickness, in | 13/64 | 15/64 | 9/64 | 5/64 |
| pH of filtrate | 4.8 | 8.1 | 5.7 | 6.8 |

Chlorides 97,000 P. P. M.

Example C

The following advantages of drilling mud containing water soluble substituted starches will be found to be true:

(1) Such drilling mud is made resistant as to change in important qualities, such as viscosity, gel strength and low water loss, to salt or anhydrite formations.

(2) Excellent logs can be obtained of all types of electrical bore hole tests, such as the "Electrolog" (a trade name) when the hole is full of such drilling mud.

(3) Large savings in weighting agents.

(4) Large savings in treating agents.

(5) When using such muds generally any intermediate strings of casings to protect the well from rock salt or bentonitic shale will be unnecessary, and their cost can be saved.

(6) The filter cake of such muds is thin, strong, impervious and has low water loss compared to ordinary mud.

(7) These muds will last longer in the drilling mud pit and well bore than most other known organic additives, withstanding chemical and bacterial action and retaining their valuable treating properties.

(8) Because the sides of the hole do not tend to dissolve or cave with such mud hole enlargement during and after drilling is kept at a minimum. Many advantages result. A broken drill string cannot get under a ledge in case of a twist off. The amount of cement used is reduced in cementing around a casing, and the cement tends to go around the entire casing, and not channel by at one point.

Example D

The following filtration tests may be made:

Table V

| Compound | Amount of Filtrate |
| --- | --- |
| (A) Lithium carboxymethyl starch ether. | Over 300 ml. in 40 seconds. |
| (B) 1% ammonium carboxymethyl starch ether in water. | Do. |
| (C) 1% sodium carboxymethyl starch ether in water. | Do. |
| (D) 15% clay in water | 46 ml. in 30 minutes. |
| (E) A+D in water | 7 ml. in 30 minutes. |
| (F) B+D in water | 12 ml. in 30 minutes. |

A pressure of 100 lbs. per square inch and a standard filter paper is used in these tests.

Example E

Samples of starch containing drilling mud and samples of drilling mud containing water soluble substituted starches selected from the group consisting of water soluble salts of substituted starch acids, and water soluble starch ethers wherein the important alkali metals are lithium, sodium and potassium and the important alkaline earth metals are magnesium, calcium, strontium and barium are left to stand for 6 months. Some of each are contaminated with sour mud (fermented starch mud) and others merely exposed to the air.

The starch containing muds will all ferment and go sour, becoming flocculated or otherwise worthless as drilling mud in a period of some days, the contaminated ones fermenting almost at once, the uncontaminated ones fermenting several days later. None of the water soluble substituted starches selected from the above enumerated group will ferment, even after six months, regardless of contamination and exposure to the air. It is possible some organism could attack them successfully, but they are much more resistant than starch containing muds.

Example F

A solution of 4 pounds to the barrel of water soluble substituted starches selected from the above enumerated group is mixed with greater than the usual maximum proportions of caustic soda, phosphates (commercially sold as "Calgon") and/or quebracho as used in starch drilling mud and no chemical changes are observed. The tests are made with both one and two chemicals added to the solution.

The above simple experiments are merely representative and are given to show how water soluble substituted starches selected from the above enumerated group may be used in water base drilling muds by those skilled in the art of water base drilling muds.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, nor from the scope of the invention as defined in the following claims. It is to be understood the invention is not to be limited to the specific details described. For example the tests with treating and control agents under Example F indicate that water soluble substituted starches are somewhat inert chemically and that all the treating, weighting and control agents of the well drilling fluid and well controlling fluid arts may, after a simple test for lack of obvious adverse reaction, be employed without invention in such drilling muds and that with few, if any, exceptions they will be so employable. My invention is therefore to be defined by the following claims.

Having described my invention, I claim:

1. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble substituted carbohydrate selected from the group consisting of water soluble salts of substituted starch acids and inulin acids and water soluble substituted starch ethers and inulin ethers in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

2. The process of claim 1 wherein said carbohydrate is a water soluble alkali metal carboxymethyl starch ether.

3. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a free acid carboxyalkyl starch ether in an amount sufficient to be converted into sufficient water soluble salts of a carboxyalkyl starch ether to lower the fluid loss through said filter cake but insufficient to increase the viscosity of said mud to such an extent as to render said drilling mud uncirculatable and contacting said wall of said well with the resulting drilling mud to form said filter cake thereon.

4. The process of claim 3 in which the carboxyalkyl starch ether is carboxymethyl starch ether.

5. In a process for drilling a well with well drilling tools wherein there is circulated in the well a water base drilling mud of a pH greater than 10 and containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a substituted starch acid in an amount sufficient to be converted into sufficient of a water soluble salt of substituted starch acid to lower the fluid loss through said filter cake but insufficient to increase the viscosity of said mud to such an extent as to render said drilling mud uncirculatable and contacting said wall of said well with the resulting drilling mud to form said filter cake thereon.

6. The process of claim 5 in which the substituted starch acid is also a substituted starch ether.

7. A water base well drilling mud comprising in combination sufficient water to maintain the mud as a fluid, sufficient clayey material to form a filter cake on the wall of the well, and a water soluble substituted carbohydrate selected from the group consisting of water soluble salts of substituted starch acids and inulin acids and water soluble substituted starch ethers and inulin ethers in an amount sufficient to reduce the water loss due to filtration through said filter cake without increasing the viscosity of said well drilling mud to such an extent that it cannot be circulated.

8. A water base well drilling mud composition comprising in combination sufficient water to maintain the mud as a fluid, sufficient clayey material to form a filter cake on the wall of the well, and a water soluble alkali metal carboxymethyl starch ether in an amount sufficient to reduce the water loss due to filtration through said filter cake without increasing the viscosity of said well drilling mud to such an extent that it cannot be circulated.

9. A water base well drilling mud comprising in combination sufficient water to maintain the mud as a fluid, sufficient clayey material to form a filter cake on the wall of the well, and a water soluble alkali metal carboxyethyl starch ether in an amount sufficient to reduce the water loss due to filtration through said filter cake without increasing the viscosity of said well drilling mud to such an extent that it cannot be circulated.

10. A water base well drilling mud comprising in combination sufficient water to maintain the mud as a fluid, sufficient clayey material to form a filter cake on the wall of the well, and a water soluble ammonium carboxyalkyl starch ether in an amount sufficient to reduce the water loss due to filtration through said filter cake without increasing the viscosity of said well drilling mud to such an extent that it cannot be circulated.

11. A water base well drilling mud comprising an aqueous fluid mixture containing suspended solids which form a filter cake on the wall of the well, and a water soluble substituted carbohydrate selected from the group consisting of water soluble salts of substituted starch acids and inulin acids and water soluble substituted starch ethers and inulin ethers in an amount sufficient to reduce the water loss due to filtration through said filter cake without increasing the viscosity of said well drilling mud to such an extent that it cannot be circulated.

12. A water base well drilling mud composition comprising an aqueous fluid mixture containing suspended solids which form a filter cake on the wall of the well, and a water soluble alkali metal carboxymethyl starch ether in an amount sufficient to reduce the water loss due to filtration through said filter cake without increasing the viscosity of said well drilling mud to such an extent that it cannot be circulated.

13. A water base well drilling mud comprising an aqueous fluid mixture containing suspended solids which form a filter cake on the wall of the well, and a water soluble alkali metal carboxyethyl starch ether in an amount sufficient to reduce the water loss due to filtration through said filter cake without increasing the viscosity of said well drilling mud to such an extent that it cannot be circulated.

14. A water base well drilling mud comprising an aqueous fluid mixture containing suspended solids which form a filter cake on the wall of the well, and a water soluble ammonium carboxyalkyl starch ether sufficient to reduce the water loss due to filtration through said filter cake without increasing the viscosity of said well drilling mud to such an extent that it cannot be circulated.

15. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble alkali metal starch sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

16. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a free acid starch sulfate in an amount sufficient to be converted into sufficient water soluble starch sulfate salts to lower the fluid loss through said filter cake but insufficient to increase the viscosity of said mud to such an extent as to render said drilling mud uncirculatable and contacting said wall of said well with the resulting drilling mud to form said filter cake thereon.

17. A water base well drilling mud composition comprising in combination sufficient water to maintain the mud as a fluid, sufficient clayey material to form a filter cake on the wall of the well, and a water soluble alkali metal starch sulfate in an amount sufficient to reduce the water loss due to filtration through said filter cake without increasing the viscosity of said well drilling mud to such an extent that it cannot be circulated.

18. A water base well drilling mud composition comprising an aqueous fluid mixture containing suspended solids which form a filter cake on the wall of the well, and a water soluble alkali metal starch sulfate in an amount sufficient to reduce the water loss due to filtration through said filter cake without increasing the viscosity of said well drilling mud to such an extent that it cannot be circulated.

19. The drilling mud composition of claim 8 wherein said alkali metal carboxymethyl starch ether is a water soluble sodium carboxymethyl starch ether.

20. The drilling mud composition of claim 12 wherein said alkali metal carboxymethyl starch ether is a water soluble sodium carboxymethyl starch ether.

21. The drilling mud composition of claim 17 wherein said alkali metal starch sulfate is a water soluble sodium starch sulfate.

22. The drilling mud composition of claim 18 wherein said alkali metal starch sulfate is a water soluble sodium starch sulfate.

23. A water base drilling mud composition comprising in combination sufficient water to maintain the mud as a fluid, sufficient clayey material to form a filter cake on the wall of a well, and a water soluble starch sulfonate selected from the group consisting of the alkali metal, alkaline earth metal and ammonium starch beta ethylsulfonates in an amount sufficient to reduce the water loss due to filtration through said filter cake without increasing the viscosity of said well drilling mud to such an extent that it cannot be circulated.

24. The composition of claim 23 wherein said starch sulfonate is a water soluble alkali metal starch beta ethylsulfonate.

25. A water base well drilling mud composition comprising an aqueous fluid mixture containing suspended inorganic finely divided solids which form a filter cake on the wall of a well, and a water soluble starch sulfonate selected from the group consisting of the alkali metal, the alkaline earth metal and the ammonium starch beta ethylsulfonates in an amount sufficient to reduce the water loss due to filtration through said filter cake without increasing the viscosity of said well drilling mud to such an extent that it cannot be circulated.

26. The composition of claim 25 wherein said starch sulfonate is a water soluble alkali metal starch beta ethylsulfonate.

27. In a process for drilling a well with well drilling tools, wherein there is circulated in the well a water base drilling mud containing solids which form a filter cake on the wall of the well suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble substituted carbohydrate selected from the group consisting of water soluble salts of substituted starch acids and inulin acids and water soluble substituted starch ethers and inulin ethers in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

28. In a process for drilling a well with well drilling tools wherein there is circulated in the well a water base drilling mud containing solids which form a filter cake on the wall of the well suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble salt of a substituted starch acid in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

29. A water base well drilling mud comprising in combination sufficient water to maintain the mud as a fluid, sufficient suspended solids to form a filter cake on the wall of the well, and a water soluble salt of a substituted starch acid in an amount sufficient to reduce the water loss due to filtration through said filter cake without increasing the viscosity of said well drilling mud to such an extent that it cannot be circulated.

30. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble sodium carboxymethyl starch ether in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

31. In a process for drilling a well with well drilling tools wherein there is circulated in the well a water base drilling mud containing solids which form a filter cake on the wall of the well suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble alkali metal carboxymethyl starch ether in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

32. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble sodium starch sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

MARTIN A. RYAN.

REFERENCES CITED

The following references are of record in the file of this patent:

UNITED STATES PATENTS

| Number | Name | Date |
|---|---|---|
| 2,129,913 | Cross et al. | Sept. 13, 1938 |
| 2,295,067 | Williams | Sept. 8, 1942 |
| 2,417,235 | Cannon | Mar. 11, 1947 |
| 2,417,307 | Larsen | Mar. 11, 1947 |
| 2,425,768 | Wagner | Aug. 19, 1947 |